United States Patent [19]

Parker

[11] Patent Number: 4,800,779
[45] Date of Patent: Jan. 31, 1989

[54] HYDRAULIC TRANSMISSIONS

[76] Inventor: Joseph W. Parker, 1121 87th St., Daly City, Calif. 94015

[21] Appl. No.: 127,585

[22] Filed: Dec. 2, 1987

Related U.S. Application Data

[63] Continuation-in-part of Ser. No. 694,355, Jan. 24, 1985, abandoned, and a continuation-in-part of Ser. No. 376,926, May 10, 1982, abandoned, and a continuation of Ser. No. 108,492, Dec. 3, 1979, abandoned, which is a continuation-in-part of Ser. No. 846,895, Oct. 31, 1977, abandoned, which is a continuation of Ser. No. 642,767, Dec. 22, 1975, abandoned, which is a continuation-in-part of Ser. No. 467,277, May 6, 1974, abandoned.

[51] Int. Cl.[4] .................. F16H 47/08; F16H 47/00
[52] U.S. Cl. ................................. 74/688; 74/731
[58] Field of Search .............. 74/677, 681, 682, 687, 74/688, 718, 730, 731, 757, 752 A

[56] References Cited

U.S. PATENT DOCUMENTS

| | | | |
|---|---|---|---|
| 2,368,873 | 2/1945 | Pollard | 74/688 X |
| 2,437,333 | 3/1948 | Pollard | 74/688 X |
| 2,634,626 | 4/1953 | Douglas | 74/688 |
| 2,674,137 | 4/1954 | Place | 74/688 |
| 2,703,500 | 3/1955 | Roche | 74/731 |
| 2,851,906 | 9/1958 | De Lorean | 74/682 X |
| 2,876,656 | 3/1959 | Herndon | 74/688 X |
| 2,924,992 | 2/1960 | Edsall | 74/688 |
| 2,947,199 | 8/1960 | Doidee et al. | 74/731 X |
| 2,950,632 | 8/1960 | Miller | 74/752 X |
| 2,957,373 | 10/1960 | Herndon et al. | 74/688 X |
| 2,968,197 | 1/1961 | De Lorean | 74/688 |
| 2,982,152 | 5/1961 | De Lorean | 74/688 |
| 3,016,768 | 1/1962 | De Lorean | 74/677 |
| 3,041,891 | 7/1962 | Black et al. | 74/688 X |
| 3,238,726 | 3/1966 | Jandasek | 74/730 X |
| 3,277,744 | 10/1966 | Stockton | 74/677 |
| 3,304,805 | 2/1967 | Parker | 74/688 X |
| 3,435,707 | 4/1969 | De Julian | 74/688 X |
| 4,184,386 | 1/1980 | Forster | 74/677 X |

Primary Examiner—Dirk Wright
Attorney, Agent, or Firm—Owen, Wickersham & Erickson

[57] ABSTRACT

The device herein described is an automatic hydraulic transmission characterized by a minimum of servo-control apparatus.

The provision hereof contemplates the extension of the torque multiplying range of a given hydrodynamic (or hydrostatic) unit by means of a fluid driven member thereof variably, differentially and continuously underdriving and overdriving the transmission's output shaft through a series of gear set-ups, in such manner that the speed ratio between fluid driven and driving members of said hydrodynamic unit is continuously varied along with the transmission's speed ratio throughout its operating range.

5 Claims, 3 Drawing Sheets

HYDRAULIC TRANSMISSIONS

This application is a continuation-in-part of application Ser. No. 694,355, filed Jan. 24, 1985, now abandoned, and a continuation-in-part of application Ser. No. 376,926 filed May 10, 1982, now abandoned, and a continuation of abandoned application Ser. No. 108,492 filed Dec. 3, 1979, which is a continuation-in-part of now also abandoned application Ser. No. 846,895 filed Oct. 31, 1977, which is a continuation of abandoned application Ser. No. 642,767 filed Dec. 22, 1975, which is a continuation-in-part of abandoned application Ser. No. 467,277 filed May 6, 1974.

The device described and claimed hereunder is a hydraulic transmission suitable for automotive vehicles—both highway and off-road, and is adaptable to a wide range of other uses, including rail, marine and industrial applications. It is intended to provide fail-safe torque-sensitive operation and overall simplification of such transmissions, a primary object being the reduction to a minimum—if not the total elimination—of conventional servo-control apparatus.

DESIGN ESSENTIALS

Basic to the design of the instant device is a planetary gear train through which a fluid-driven member drives the output shaft to provide a series of drive paths (including two or more split torque paths) sequentially established through the inertial interaction of a freewheel (or one-way clutch) and planetary gear system. Throughout the entire sequence, a principal fluid-driven member is geared to drive the transmission's output through the gearing in such manner that the fluid driven speed ratio is continuously varied along with the transmission's overall speed ratio.

In the exemplified embodiments these torque drive paths are so ordered that as the transmission is progressed through its operating range from a starting condition toward a high speed drive, said fluid-driven member must be progressed from an underdrive of an output member of the planetary gearing toward an overdrive of an output member of said planetary gearing and the torque split in the gearing progresses toward a decreasingly negative feedback condition as engine throttle is held constant, or toward an increasingly negative feedback condition as engine throttle is increased above a predetermined rate.

In this manner, the high-efficiency portion of the torque-multiplying range of a torque-converter may be extended in lieu of the recycling which characterizes conventional designs.

Given hypothetically constant speed rotation of one principal member of the planetary gearing (i.e. a sun gear, ring gear or planet carrier), another member thereof accelerated under the influence of a fluid driven member will effectuate a continuously variable rotating speed differential between any plurality of said gear members.

Accordingly, the gearing and freewheel system are so arranged that, given the input shaft rotating at a hypothetically constant speed and the output shaft simultaneously progressed from rest toward input shaft speed, freewheel interchanges must be effected by reaction of predetermined junctures in the differentially varied speeds of members of the gearing, whereby the driving and driven elements of the appropriate freewheel clutches would also be fully synchronized at the initiation of engagement.

During this progression the gear change is governed in an inherently automatic manner, in provision whereof, when a plurality of freewheel clutches (each having driving and driven elements) are simultaneously disposed to drive a common member through parallel power path drives at a point of interchange predetermined by ratios in the gearing, from said point onward the freewheel driving element being in the drive capable of more rapidly accelerating said common member will remain reactively engaged with its driven element to drive said common member, while the other driving element will be freed from reactive engagement with its driven element to deactivate its drive. In this manner, an interchange between freewheel clutches is effected at the aforesaid predetermined juncture in the differentially varied speeds of elements in the gearing.

This rule of interchange is basic to the design of the instant device and governs the inherently automatic operation thereof.

FORMS OF THE INVENTION

In a first preferred embodiment of the invention, the foregoing progression is a portion of a first drive sequence wherein the turbine of a first torque converter is connected to drive the output shaft. Said first drive is optionally extended at the high speed end through gear set-ups secured by means other than or additional to said freewheel clutches.

Simultaneously with said first drive sequence, a second drive is provided with a primary purpose of blending the inherently high input torque rise characteristics of said first drive with the stable input torque characteristics of a drive featuring positive recirculative torque feedback.

In this second drive a second torque converter's stator is connected to drivingly rotate with the input shaft to unload the same for starting and low speed operation, while the turbine drives the output shaft through a planetary gear train having its reaction member also connected to drivingly rotate with the input shaft to unload the same. In both drives the reaction gear member is rotatable with, and in such relation to the rotation of, the input shaft as to produce a differentially variable ratio overdrive of said gear train's output member by it's input member, while providing a reduction in positive recirculative torque feedback to enhance high speed ratio efficiency without requiring extreme ratios in the planetary gearing.

The relative capacities of these two torque converters will depend in part upon the characteristics of the engine with which the transmission is to be matched, with the combination of the two drives providing a transmission adaptable to a wide variety of power sources and applications. However, for adaption to engines characterized by high torque rise, the second torque converter and its drive may be considered optional.

Whereas the aforesaid first preferred embodiment utilizes but one planetary gear set for the "first drive", a second preferred embodiment utilizes a second planetary gear set for said first drive to provide interchange between first and second speeds at transmission speed ratios permitting greater efficiency (at said interchange) than would be available with one planetary gear set.

IN THE DRAWINGS

FIG. 4 is a graphical representation of the kinematics of key parts of both FIG. 1 and FIG. 3 embodiments, predicted upon hypothetically constant input shaft speed. Broken speed lines pertain to parts of the FIG. 3 device additional to parts thereof correponding to those of the FIG. 1 device.

IN THE FIG. 1 EMBODIMENT

Figure 1:
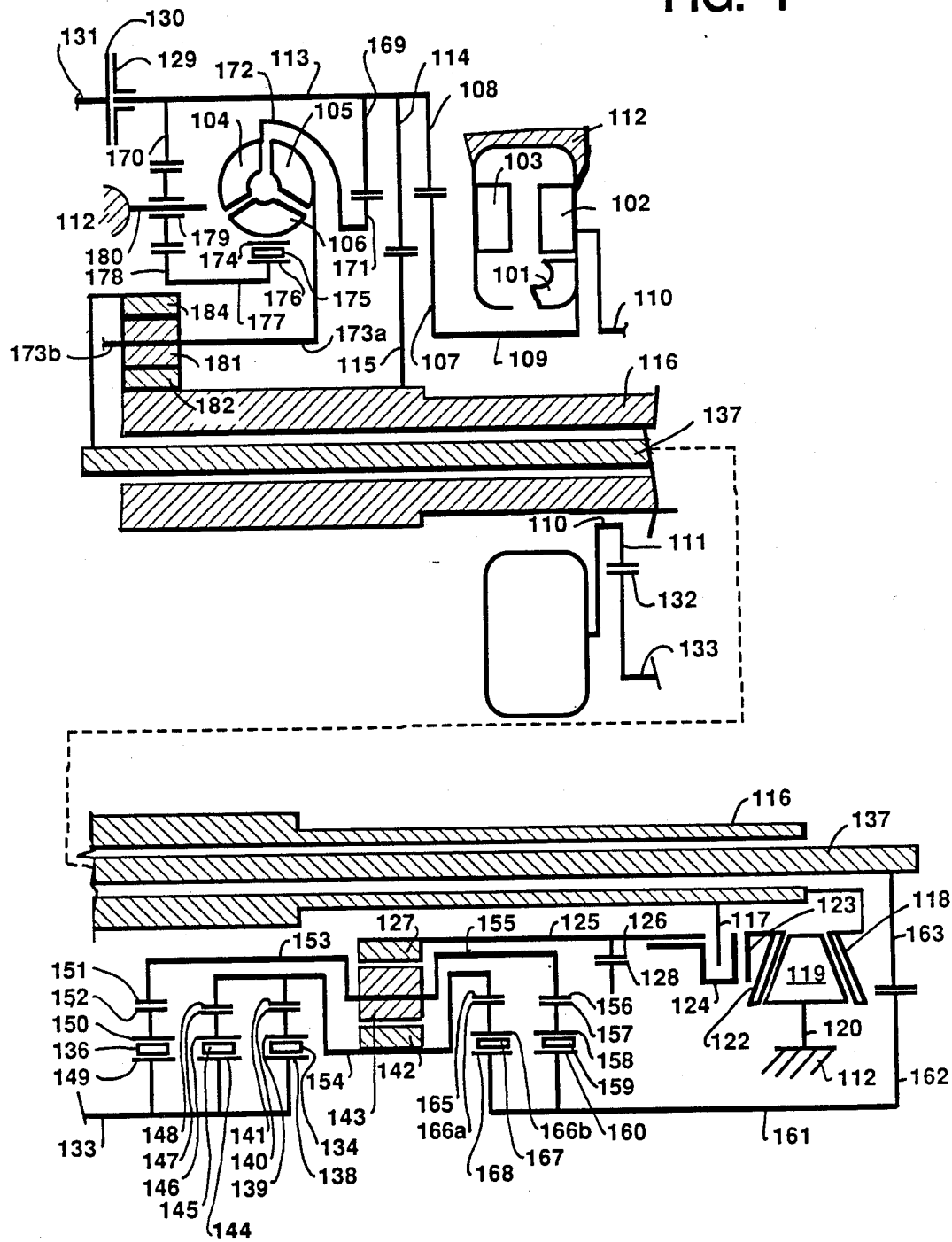
FIG. 1 is a simplified representation—in longitudinal part section—of said first preferred embodiment of the invention.

The compound transmission of FIG. 1 combines first and second simultaneous and parallel drives through first torque converter section 101, 102, 103, and second torque converter section 104, 105, 106, respectively.

In the structure for said first drive, secondary gear 107 is meshed with primary gear 108 and is integral with sleeve 109 and pump 101. Turbine 102 is mounted on turboshaft 110, which in turn is integral with turbo driving gear 111. Said turbine 102 is driven through fluid circulated within stationary housing 112 by said pump 102.

Stator 103 is grounded to housing 112 and is included in the path of said fluid to multiply the torque therein.

Said primary gear 108 is integral with input shaft 113 and primary gear 114. Meshed therewith is secondary gear 115, integral with sleeve 116, fixed clutch member 117 and develled driving gear 118. Bevelled idler 119, supported on pinion 120 (fixed to housing element 112) is meshed with said driving gear 118 and bevelled driven gear 122, integral with fixed blutch member 123.

Movable clutch member 124 is splined for longitudinal movement on sleeve 125, integral with brake drum 126 and sun gear 127. Brake element 128 is actuated by any convenient means (not shown).

Said input shaft 113 is splined for movement thereon of engine disconnect clutch member 129. Engine disconnect clutch member 130 is integral with engine driven shaft 131.

Meshed with said turbo driving gear 111 is turbo driven gear 132, integral with countershaft 133.

Indicated generally at 134, 135, and 136, are freewheels which, when alternately and sequentially engaged by reaction, establish partial paths in the gearing through which said turbine 102 drives output shaft 137 through a sequence of speeds, as follows:

A first speed power path is partially completed by freewheel driver 138 (mounted on countershaft 133), rollers 134, freewheel runner 139, driving gear 140 (integral with said runner 139 and meshed with driven gear 141), integral with ring gear 142, which is meshed with planet gears 143.

A second speed power path is partially completed by freewheel driver 144 (also mounted on counter shaft 133), rollers 135, freewheel runner 146 integral with driving gear 147. Driven gear 148, meshed therewith is integral with ring gear 142.

Third, fourth, fifth and sixth speed power paths are partially completed by freewheel driver 149 (also mounted on countershaft 133), rollers 136, freewheel runner 150, driving gear 151 integral therewith, driven gear 152 meshed with said driving gear 151 and integral with sleeve 153 and planet carrier 154 (carrying planet gears 143).

For said first and second speed power paths, said ring gear 142 is in mutual reaction with said sun gear 127, through which a portion of the torque load is shunted around converter 101, 102, 103 and is directly assumed by input shaft 113.

Said first, second and third speed power paths are completed by sleeve 155 (integral with planet carrier 154) and with driving gear 156, driven gear 157 (meshed therewith and integral with freewheel driver 158), rollers 159, freewheel runner 160, countershaft 161 integral therewith and with output driving gear 162, and output driven gear 163, meshed therewith and mounted on output shaft 137.

Said fourth speed power path is continued between said ring gear 142 and countershaft 161 by driving gear 165 (integral with ring gear 142 and meshed with driven gear 166a), freewheel driver 166b integral therewith, rollers 167, and freewheel runner 168 (integral with said countershaft 161), and is completed between said countershaft 161 and output shaft 137 through the structure specified in the immediately foregoing for the completion of said first, second and third speed drive paths.

Said ring gear 142 and sun gear 127 are in mutual reaction with each other in said fourth speed path, whereby said second turbine 102, through planet carrier 154 and planet gears 143, simultaneously drives output shaft 137 and drivingly unloads input shaft 113 with positive recirculatory torque feedback thereto.

The third path may be optionally eliminated (allowing an interchange directly between the second and forth speed paths) by altering ratios in the gearing in such manner that the freewheel drivers and runners for said fourth speed path become differently synchronized while said second speed path if operative.

Fifth and sixth speed power paths are established by means of alternatingly holding sun gear 127 against rotation for a single path overdrive by turbine 102 through planet gears 143 and ring gear 142, and connecting sun gear 127 to be driven by (rather than to drive) said input shaft 143, for a high speed differential overdrive by said turbine 102, featuring both said turbine 102 and input shaft 113 in mutual reaction in a split torque overdrive of the outputs shaft 137 through ring gear 142.

In the structure of said second drive, input shaft 113 is integral with primary gear 169 and feed-back driven gear 170. Said primary gear 169, being also a pump primary gear, is meshed with pump secondary gear 171, which in turn is integral with rotating housing 172 and pump 104.

Turbine 105 (enclosed within said housing 172) is driven by fluid circulated by said pump 104.

During interchange between speeds the freewheel clutch about to be engaged and the freewheel clutch about to be disengaged will be simultaneously engaged while the torque load gradually shifts from one to the other. This will allow a change in input shaft (and engine) speed during the interchange, under changing input load.

Rotating reactor 106 is included in the path of the fluid to multiply the torque therein.

In one torque feedback path for said second drive, said rotating reactor is integral with freewheel driver 174 which, through rollers 175, drives freewheel runner 176. Integral with said runner 176 are reaction shaft 177 and feedback driving gear 178. Meshed with said feedback driving gear 178 and driving gear 170 is idler gear 179, which is pinioned on idler shaft 180. Said idler shaft and all other shafts (excepting those on which planet gears are pinioned) are supported by, and in fixed pivot position in relation to, elements of transmission housing 112.

In the other feedback path, said turbine 105 is mounted on sleeve 173a, integral with planet carrier 173b, carrying planet gears 181, meshed with sun gear 182 and ring gear 184. Said sun gear 182 and sleeve 116, integral therewith, along with meshed gears 115 and 114, constitute a torque feedback path to unload input shaft 113.

Said planet gears 181 split the torque on turbine 105 so that the torque not fed back in the immediately foregoing is applied to output shaft 137, integral with said ring gear 184, to complete the second drive.

Reverse gearing (not shown) may be of any convenient type.

OPERATION OF THE FIG. 1 TRANSMISSION

Forward drive from a standing start toward top speed simultaneously involves both torque converters in parallel drive of the output shaft, with turbine 105 being in continuous drive of output shaft 137 through the immediately aforementioned planetary gear train.

Throughout a major portion of the "second drive", the reaction torque on rotating reactor 106 is negative, forcing said reactor to rotate in reverse against freewheel 175 and increasing the torque on said turbine 105 by the amount of said reaction torque and simultaneously therewith feeding back said negative torque in a positive direction of rotation through idler gear 179 to unload input shaft 113.

When said reaction torque has decreased to zero, said rotating reactor 106 reverses its rotation and begins to follow said turbine 105 in rotation in a fluid coupling condition.

With reference now to the "first drive", involving turbine 102 in a series of drives through the gearing simultaneously with the foregoing, the present embodiment featuers said turbine 102 in three two-path (or split torque) drives and one single path drive. The first two of said drives feature input shaft 113 and turbine 102 in two-path torque split drives of the output shaft, whereas the third drive is a single path drive of the output shaft by said turbine 103 and the fourth drive features the positive recirculative torque split feedback mentioned early in the foregoing. In the latter positive torque split, said turbine 102 drives both input shaft 113 and output shaft 137 simultaneously.

Progression through these drives (or "speeds" as it might be in the case of an automotive vehicle utilizing the transmission) is according to the rule of freewheel interchange governing the operation of the instant device, as indicated under the foregoing heading "Design Essentials".

For example, in first speed forward from a standing start, in the initial condition with sun gear 127 rotating in a given direction, ring gear 142 must be reactively forced to rotate in the opposite direction as carrier 154 is stalled under output load. Since said ring gear 142 can be connected to reverse said turbine 102 at a greater rotational velocity through freewheel 134 than through freewheel 135, said freewheel 134 must be engaged.

As the turbine's reactive reverse rotation is retarded in first speed (under the forward driving influence of pump 101) and is brought to rest along with ring gear 142, planet carrier 154 must overcome its stalled condition and be rotated in the direction of rotation of sun gear 127, moving the output shaft and the vehicle.

From said rest condition, said ring gear 142 is now driven forwardly by turbine 102 in second speed, and since it can be driven by turbine 102 at a greater rotational velocity through freewheel 135 than through freewheel 134, said freewheel 135 must now be engaged.

Accordingly, during this forward progress of carrier 154 (and the corresponding forward movement of the vehicle) a freewheel interchange occurs between first and second speeds, before which freewheel clutch elements 138 and 189 are synchronized as freewheel clutch elements 144 and 146 are differentially progressed toward synchronization, and after which said clutch elements 144 and 146 remain synchronized as clutch elements 138 and 189 are differentially desynchronized.

In this manner the appropriate freewheel clutches are synchronized and desynchronized (as they are reactively engaged and disengaged) throughout the remaining progression through the first four speeds.

A brief recitation of the freewheel elements sequentially engaged by reaction for the inherently automatic sequence of speeds is as follows, with respect to the first drive of turbine 102:

The first speed drive is partially through freewheels indicated generally at 134 and 159;
The second speed drive is partially through freewheels indicated generally at 135 and 159;
The third speed drive is through freewheels indicated generally at 136 and 159; and
The fourth speed drive is through freewheels indicated generally at 136 and 167.

The drive by turbine 102, however, is interrupted during fourth speed, when the transmission is conditioned for a fifth speed drive by the disengagement of clutch members 124 and 117 and the holding of brake drum 126 (by brake element 128) against rotation, along with sleeve 125 and sun gear 127. Turbine 102 is hereby established in a single path overdrive of the output shaft.

Interruption of the immediately foregoing fifth speed drive occurs when the transmission is conditioned for sixth speed drive by the release of brake element 128 and the engagement of movable clutch member 124 with fixed clutch member 123.

Turbine 102 and input shaft 113, through planet carrier 154 and sun gear 127, respectively, now drive the output shaft through ring gear 142 with said sun gear 127 rotating in a negative direction and establishing the turbine 102 in a high speed differential overdrive (in split-torque combination with the input shaft) of the output shaft.

In partial summary of the FIG. 1 embodiment and its operation:

Input shaft 113 is an input member and countershaft 161 may be considered an output member. Pump 101 and turbine 102 are fluid driving and driven members respectively. Gear members 108, 107, 109, 110, 111, 132, 133, 140, 141, 142, 143, 127, 154, 155, 156 and 157 and parts connecting sun gear 127 to rotate with input shaft 113, together with freewheel members 138, 134, 139, 158, 159 and 160, constitute a first combination of gear and clutch members.

Gear members 108, 107, 109, 110, 111, 132, 133, 147, 148, 142, 127, 154, 155, 156 and 157, and parts connecting sun gear 127 to rotate with input shaft 113, together with freewheel members 144, 135, 156, 158, 159 and 160, constitute a second combination of gear and clutch members having some of its members in common with said first combination of gear and clutch members.

Said first and second combinations are alternatively operative to establish said turbine 102 in driving relation to said countershaft 161 for mutually alternative first and second drives thereof.

Said first combination is made operative in part when freewheel (clutch) members 138 and 139 are in synchronous rotation to be conditioned for engagement.

Said second combination is made opeartive in part when freewheel (clutch) members 144 and 146 are in synchronous rotation to be conditioned for engagement.

Said freewheel (clutch) members 138 and 139 are in synchronous rotation and thereby operative for said first drive in alternative with said freewheel (clutch) members 144 and 146 being in synchronous rotation and thereby operative for said second drive.

Accordingly, the parts enumerated as being embodied in said first and second combinations constitute, in total combination, means including planetary gear means whereby progression of said turbine 102 in rotation toward a predetermined speed ratio with the rotation of said pump 101 during said first drive progressively decreases an existing difference between the rotating speeds of said freewheel (clutch) members 144 and 146 to zero with the attainment of synchronous rotation thereof, and whereby progression of said turbine 102 in rotation beyond said predetermined speed ratio with the rotation of said pump 101 toward a higher speed ratio during said second drive initiates and progressively increases a difference between the rotating speeds of said freewheel (clutch) members 138 and 139 in digression from synchronous rotation thereof.

IN THE FIG. 2 EMBODIMENT

Figure 2:
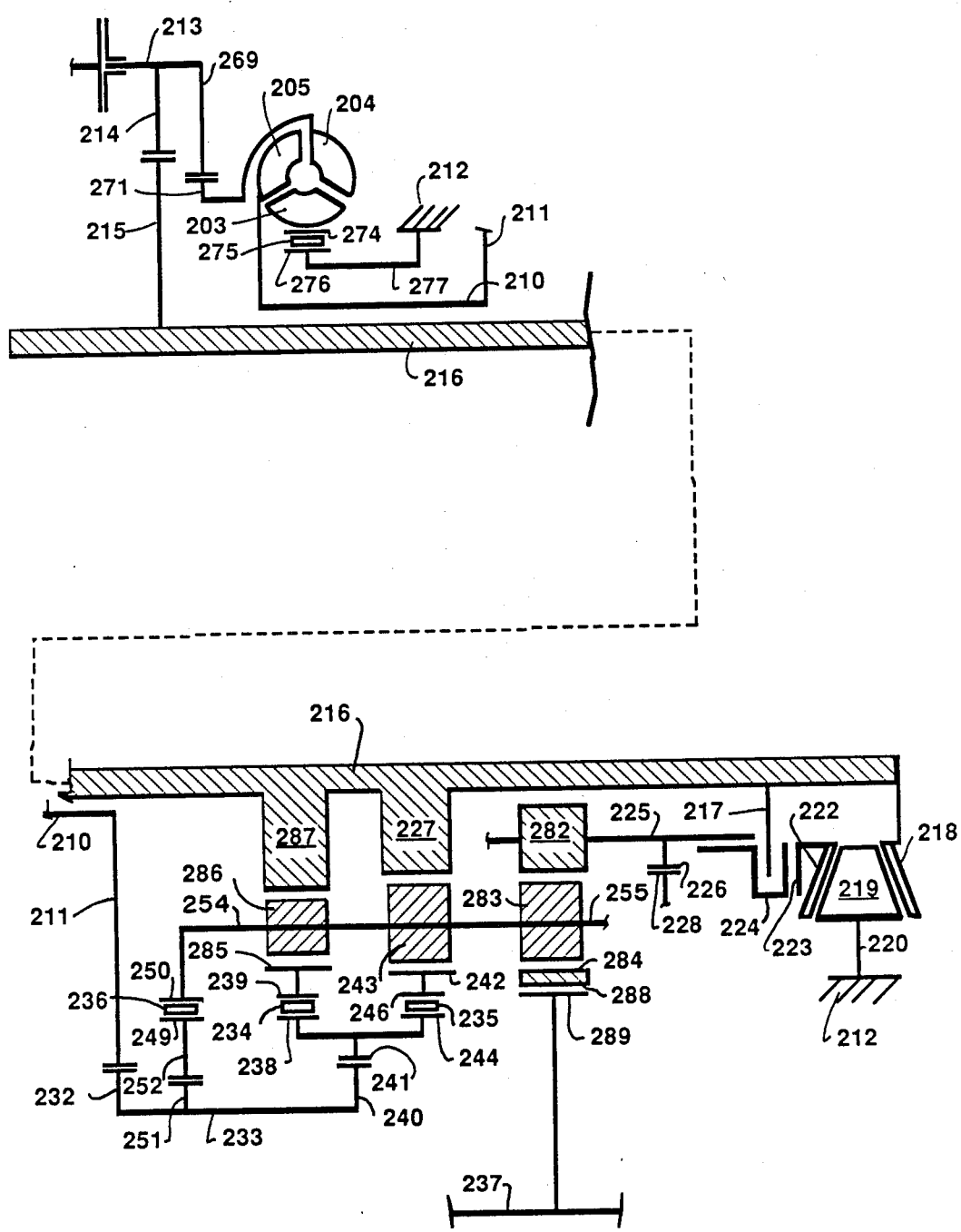
FIG. 2 is partial drawing similar to that of FIG. 1 showing a portion of the gearing of said FIG. 1 modified to proivde said second preferred embodiment of the invention.

Two important modifications to the foregoingly described device are embodied in that of FIG. 2. One of these is the elimination of the "second drive" of the FIG. 1 device (with its positive recirculative torque feedback feature) in favor of a planetary gearset as an extension of the planetary gearing of the first drive of the FIG. 1 device.

This extension provides an alternative means of continuous positive feedback during the inherently automatic drive sequence.

This "sequence" refers to the first four speeds of the FIG. 1 device, and first, second and third speeds of the FIG. 2 device to be described.

The "positive feedack" feature characterizes a first of three modes of operation provided by the above mentioned added gearset, which is controlled by a mechanism corresponding to that of FIG. 1 and comprising parts 218, 219, 220, 222, 233, 224, 225, 226 and 228.

As in the FIG. 1 device, this feedback feature is desireable in applications wherein the high torque rise characteristic of split-torque gearing needs to be stabilized.

The other modification is the addition of a planetary gearset in duplex configuration with one corresponding to the FIG. 1 "first drive" gearset, to provide a point of interchange between first and second speeds in conjunction with a higher overall transmission speed ratio than that pertaining to the corresponding interchange of the FIG. 1 device. Overall transmission efficiency at this point is hereby enhanced.

The numbering of parts in FIG. 2 is such that parts in both figures having similar functions are numbered with the same latter two digits, respectively.

It should be noted that the gearing at the input end is hereby simplified. It may be further simplified by connecting input shaft 213 directly to both main shaft 216, converter housing 221 and pump 201, so that these parts may all be in alingnment with each other.

The inherently automatic three speed sequence is effective through a low speed feedback range when clutch 224 is engaged with clutch 217.

The same three speed sequence is effective through a middle speed range when brake 228 is applied (clutch 224 and 217 being disengaged), and through a high speed range when clutch 224 is engaged with clutch 223.

The middle speed range provides grounded reaction for an overdrive of ring gear 284 by planet carrier 255 through planet gears 283.

The high speed range is characterized by having sun gear 282 driven by—rather than driving—input shaft 213, for an overdrive by turbine 202, featuring both the latter and input shaft 213 in mutual reaction for a split-torque overdrive of output shaft 237 through planet gears 283 and ring gear 284.

Selection among these ranges (whether automatic or manual) corresponds to selection of fourth, fifth or sixth speed in the FIG. 1 device.

In any of the foregoing drive ranges, the inherently automatic three speed sequence is characterized as in the following:

A first speed power path is partially completed by driving gear 240 (integral with countershaft 233) driven gear 241 meshed therewith, freewheel driver 238, rollers 234, freewheel runner 239, ring gear 285 and planet gears 286 meshed therewith.

A second speed power path is the same as that of first speed except that from driven gear 241 onward, power is delivered through freewheel driver 244, rollers 235, freewheel runner 246, ring gear 242 and planet gears 243 meshed therewith.

A third speed power path is partially completed by driving gear 251 (integral with countershaft 233) driven gear 252 meshed therewith, freewheel driver 249, rollers 236, and freewheel runner 250.

For said first and second speed power paths, ring gears 285 and 242 are in mutual reaction with sun gears 287 and 227 through plant gears 286 and 243, respectively, whereby a portion of the torque load is shunted around torque converter 201, 202, 203, and is directly assumed by input shaft 213.

Said first, second and third speed power paths are completed by planet carrier 254 (integral with freewheel runner 250), and extended as planet carrier 255. The latter carries planet gears 283, meshed with sun gear 282 and ring gear 284. The latter is integral with output driving gear 288, meshed with output driven gear 289, which is integral with output shaft 237.

Freewheel clutch combinations may be generally referred to as "freewheel clutches" by their respective roller numbers; e.g. 238, 234, 239 may be referred to as freewheel clutch 234, etc.

This inherently automatic speed change sequence is governed by the rule of interchange described in the foregoing under "DESIGN ESSENTIALS".

FIG. 2 DEVICE OPERATING CHARACTERISTICS

Figure 3:
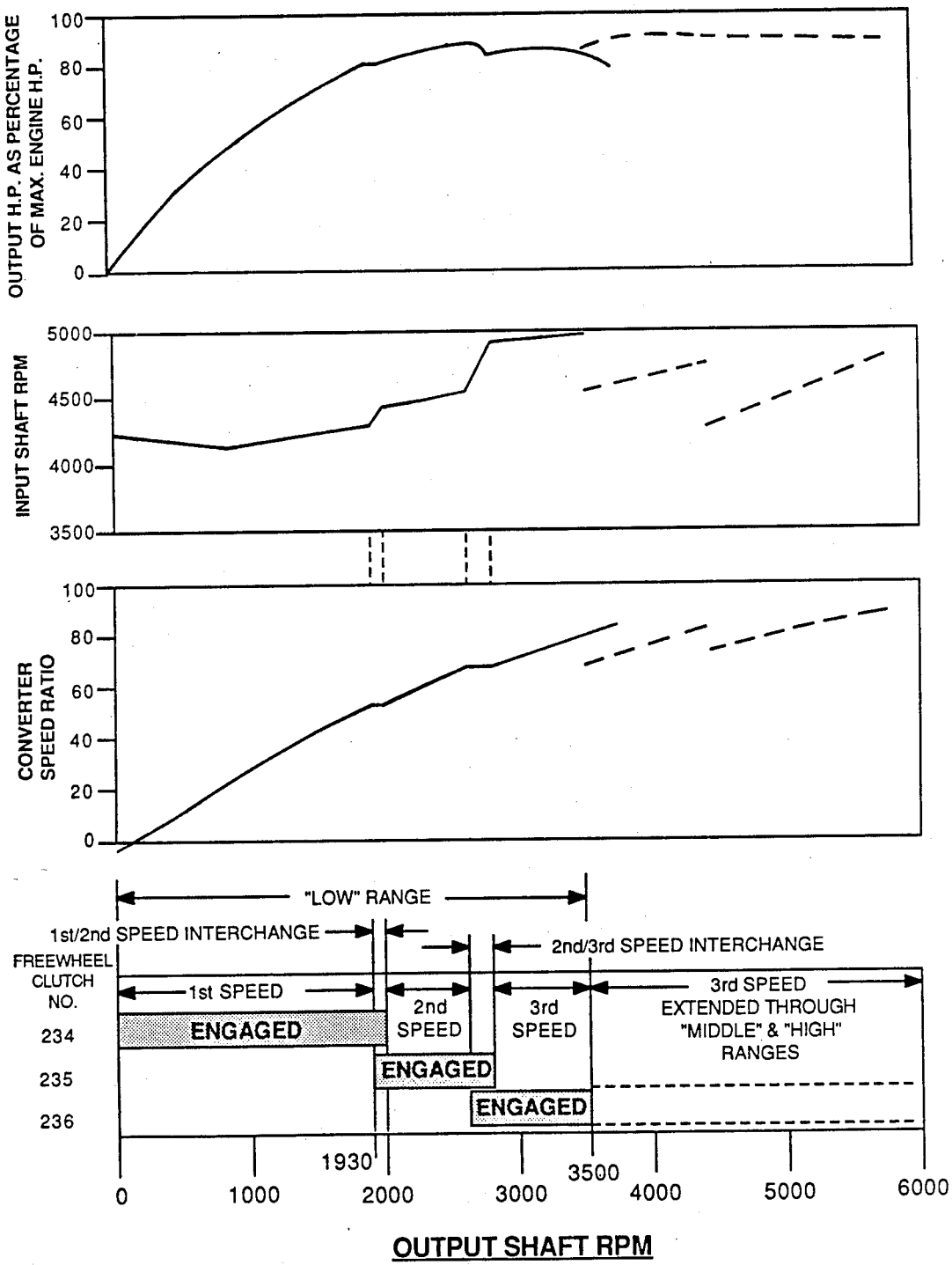
FIG. 3 is a graphical representation of power availability in reference to the FIG. 2 device, with corresponding information.

The operating characteristics of the FIG. 2 device, with respect to freewheel clutch engagement and the interchange between operative freewheels—all in relation to speed ratios in the torque converter—are illustrated in the lower portion of FIG. 3.

The upper portion of the figure serves as a hypothetical approximation of performance wherein an engine's speed under full throttle is shown to be near or within its peak power range.

Corresponding power availability is shown in the top curve to incorporate both transmission efficiency and engine performance in a single curve representing output power as a percentage of maximum engine power.

The characteristics of the three speed progression in the low speed range are indicated by solid lines, while those of the middle and high speed ranges are indicated by broken lines. These characteristics are exemplary, and subject to wide variation according to the selection of gear ratios, the type of torque converter used and the type of engine with which the transmission is matched, etc.

The rather sharp increase in engine speed during interchange between second and third speeds reflects a substantial input torque load change between the split torque drive and the single path drive. Accordingly, in lieu of the single path drive, a third split torque drive may be substituted by the addition of a planetary gearset, to reduce the input torque differential between second and third speeds.

Widening the inherently automatic split torque multiple speed range by the suggested addition with extend the high efficiency power availability range thereof.

Indeed, there is no theoretical limit to the number of planetary gearsets—and corresponding split torque speeds—possible in the multiplex cluster of gearsets 252, 286, 257 and 242, 243, 227.

IN PARTIAL REVIEW OF STRUCTURE AND FUNCTION

In FIG. 1, input shaft 113 is an input member and countershaft 151 may be considered an output member. Pump 101 and turbine 102 are fluid driving and driven members, respectively. Gear members 108, 107, 109, 110, 111, 32, 133, 140, 141, 142, 143, 127, 154, 155, 156 and 157 and parts connecting sun gear 127 to rotate with input shaft 113, together with freewheel members 138, 134, 139, 158, 159 and 160, constitute a first combination of gear and clutch members.

Gear members 108, 107, 109, 110, 111, 132, 133, 147, 148, 142, 127, 154, 155, 156 and 157, and parts connecting sun gear 127 to rotate with input shaft 113, together with freewheel members 144, 135, 156, 158, 159 and 160, constitute a second combination of gear and clutch members having some of its members in common with said first combination of gear and clutch members.

Said first and second combinations are alternatively operative to establish said turbine 102 in driving relation to said countershaft 161 for mutually alternative first and second drives thereof.

Said first combination is made operative in part when freewheel (clutch) members 138 and 139 are in synchronous rotation for engagement.

Said second combination is made operative in part when freewheel (clutch) members 144 and 146 are in synchronous rotation for engagement.

Said freewheel (clutch) members 138 and 189 are in synchronous rotation to be engaged and thereby operative for said first drive in alternation with said freewheel (clutch) members 144 and 146 being in synchronous rotation to be engaged and thereby operative for said second drive.

Accordingly, the parts enumerated as being embodied in said first and second combinations constitute, in total combination, means including epicyclic planetary gear means whereby progression of said turbine 102 in rotation toward a predetermined speed ratio with the rotation of said pump 101 during said first drive progressively decreases an existing difference between the rotating speeds of said freewheeel (clutch) members 144 and 146 to zero with the attainment of synchronous rotation thereof, and whereby progression of said turbine 102 in rotation beyond said predetermined speed ratio with the rotation of said pump 101 toward a higher speed ratio during said second drive inititates and progressively increases a difference between the rotating speeds of said freewheel (clutch) members 138 and 139 in digression from synchronous rotation thereof.

OPTIONS

A goodly number of modifications to the instant device might well occur to those skilled in the subject art. A partial list would include:

Exchange of roles as input, output and reaction members between members of a planetary gearset (for example, in FIG. 2 the final planetary gear set may be connected with other transmission members in such manner that both sun gear and ring gear may enjoy unidirectional rotation in the high speed range);

Addition of two-way clutches or other lock-up devices to freewheels, to allow servo-control intermediate speed selection, or mechanical breaking through the transmission, manual override of the inherently automatic speed sequence, or the like; and A hydrodynamic brake as might be desired in lieu of, or supplementary to, mechanical braking.

No doubt many other modifications may suggest themselves, which are also within the scope of this invention as described in the foregoing and claimed hereunder.

I claim:

1. In a power transmitting device having input and output members, fluid drive means including fluid driving and fluid driven members, and gear and clutch means including an epicyclic gear train:

said fluid driving member being drivenly connected to said input member and driving said fluid driven member through fluid means in rotation toward and beyond a predetermined speed ratio with the rotation of said fluid driving member, said fluid driven member being connected to drive said output member through mutually alternative and sequentially operative combinations of gear and clutch members having a portion of their members in common;

a first of said combinations made operative in part by the synchronous rotation together of first driving and driven clutch members for engagement thereof for a first drive of said output members by said fluid driven member, and a second of said combinations being made operative in part by the synchronous rotation together of second driving and driven clutch members for engagement thereof for a second drive of said output member by said fluid driven member; said first driving and driven clutch members being hereby operative in alternation with said second driving and driven clutch members being operative, and said second driving and driven clutch members being hereby operative in alternation with said first driving and driven clutch members being operative;

means included in said first and second combinations and including an epicyclic gear train, whereby progression of said fluid driven member in rotation toward said predetermined speed ratio with the rotation of said fluid driving member during said first drive progressively decreases an existing difference between the rotating speeds of said second driving and driven clutch members to zero with the attainment of synchronous rotation thereof, and whereby progression of said fluid driven member beyond said predetermined speed ratio toward a higher speed ratio during said second drive initiates and progressively increases a difference between the rotating speeds of said first driving and driven clutch members in digression from synchronous rotation thereof.

2. The embodiment of claim 1 wherein one of said mutually alternative combinations establishes said input member and said fluid driven member simultaneously in a dual path split torque drive of said output member.

3. The embodiment of claim 1 wherein each of said mutually alternative combinations establishes said input member and said fluid driven member simultaneously in dual path split torque drive of said output member.

4. The embodiment of claim 1 wherein one of said mutually alternative combinations establishes said fluid driven member in a positive recirculative split torque drive of said output and input members.

5. The embodiment of claim 1 wherein one of said mutually alternative combinations establishes said input member and said fluid driven member simultaneously in a dual path split torque drive of said output member, and wherein the other of said mutually alternative combinations establishes said fluid driven member in a single path drive or said output member.

* * * * *